Nov. 8, 1955     L. J. COLLINS     2,723,110
SANITARY BEARING AND SHAFT COMBINATION
Filed Dec. 21, 1953
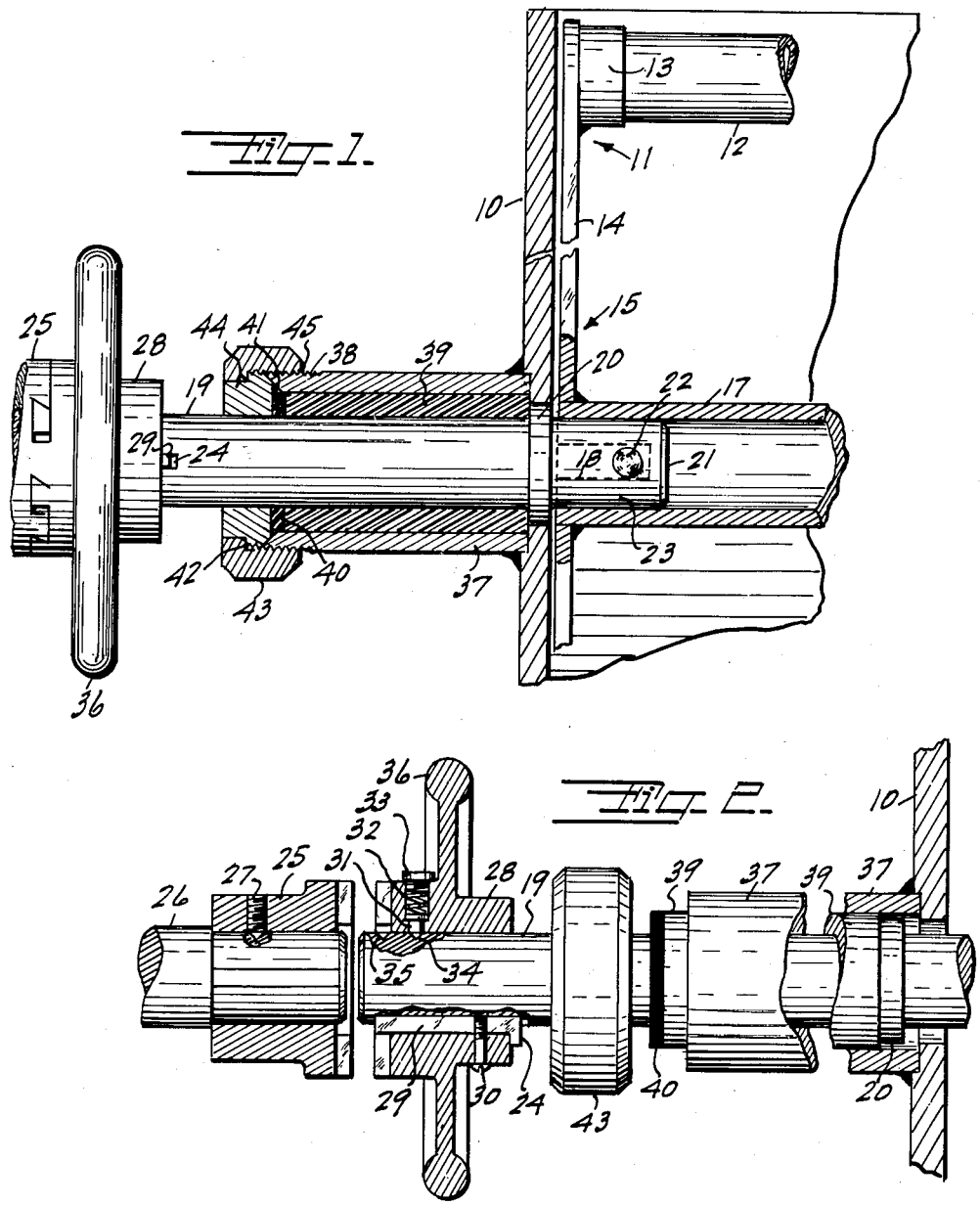
INVENTOR.
Lowell J. Collins
BY
Philip A. Truedell
Attorney

United States Patent Office 2,723,110
Patented Nov. 8, 1955

2,723,110

SANITARY BEARING AND SHAFT COMBINATION

Lowell J. Collins, Oakland, Calif.

Application December 21, 1953, Serial No. 399,300

8 Claims. (Cl. 259—110)

This invention relates to improvements in bearings and shafts for food mixing machines as also for any other type of machine in which a retractable shaft is desirable or necessary, and provides a combination of shaft and bearing which can quickly and easily be removed, disassembled and cleaned. This invention also provides means for manually rotating the shaft when disconnected from the power driving means, and in this respect is particularly desirable for mixing machines for advancing the agitator for discharge of the contents.

It is known that certain types of bearings and shafts have been used, but in all cases, so far as is known, the removal and disassembly is usually either difficult or slow, or both, while my new invention provides a combination of the utmost simplicity in both, construction and assembly, making each part of the combination completely accessible when disassembled.

Mixers for various food combinations, such as cottage cheese, salads, candy mixtures, and the like are formed throughout of non-corrosive material, such as Monel metal, stainless steel, or plastic, to prevent any contamination of the food. It is also very important that every part, including shafts, bearings, the agitator and any other elements, may be individually cleaned and sterilized, and one portion, the shaft and bearing assembly has been the most difficult to form in a manner in which this cleaning and sterilizing can be easily and quickly accomplished. Furthermore, the attempt has been to seal the bearing at the container wall to prevent lubricating oil from entering the container and being mixed into the food product.

My invention overcomes all of the above objections and disadvantages, providing a combination which can be assembled or disassembled in a minute or two, and which requires no oil or other conventional lubricant, since the liquid in any of the various food products provides the necessary lubrication, having no corrosive or decomposing action on the bearing irrespective of the type of liquid contained in the food product.

The objects and advantages of the invention are as follows:

First, to provide a shaft and bearing combination which is quickly and easily removable from a machine, and which can be easily and quickly assembled and disassembled.

Second, to provide a bearing as outlined which requires no applied lubrication, all lubrication being provided by the liquids in the machine.

Third, to provide a combination as outlined in which the shaft is provided with means for coupling to a prime mover and which coupling is easily and quickly released and removable from the shaft and which coupling means includes spring urged engaging means to maintain the coupling means against accidental displacement.

Fourth, to provide coupling means as outlined with a hand wheel for retracting the coupling means and for manually rotating the shaft when the coupling is disengaged from the prime mover.

Fifth, to provide a combination as outlined which is simple in construction and effective against axial displacement of the shaft when coupled to the driven member of the machine.

In describing the invention reference will be had to the accompanying drawings, in which:

Fig. 1 is a side elevation of the invention in assembled condition and partly shown in section.

Fig. 2 shows the invention in partly disassembled condition, partly shown in section and a portion broken out.

The mixing bowl of a food mixer usually has straight end walls 10 and a semi-cylindrical bottom. An agitator 11 operates in close proximity to this semi-cylindrical bottom and is axially mounted in the bowl. The agitator shown fragmentarily in Fig. 1 is very efficient in operation particularly on salads and similar products because the cross bars 12 are cylindrical in form and easily rotatable in the bearings 13, these bearings being fixed to the arms 14 of a spider 15 which spider is mounted on the tubular shaft 17 which has bayonet slots 18 formed in the respective ends.

The invention consists of a shaft 19 which has an annular collar 20 formed thereon in spaced relation to the inner end 21, and has a diametric pin 22 fixed in this coupling portion 23 between the collar 20 and the end 21. The other end of this shaft outwardly from the annular collar is plain and of equal diameter throughout, and has a keyway 24 formed inwardly from the outer end.

A coupling or clutch member 25 is fixed on the drive shaft 26 as indicated at 27, this shaft 26 comprising a speed reducer shaft or a motor shaft with internal speed reduction, and may be of any suitable form, such as the jaw clutch shown.

The mating coupling or clutch member 28 is slidable on the shaft 19 and has a key 29 fixed therein as indicated at 30 and is slidable in the keyway 24. Suitable releasable securing means such as the plunger 31 urged by a spring 32 and backed up by a plug or screw 33 engages in a countersink 34 when the clutch member 28 is retracted or uncoupled from the drive shaft 26. A second countersink 35 is located for cooperation with the plunger when the member 28 is coupled to the drive shaft 26.

A handwheel 36 is mounted on or formed integrally with this clutch member 28. This handwheel is used for two different purposes, that of retracting the coupling member for disengagement from the drive shaft, and, for rotating the agitator 11 manually for quicker and more thorough discharge of the contents from the bowl when the bowl is tilted for discharge into another vessel or container.

The bearing combination includes a bearing sleeve 37 formed of non-corrosive material and axially fixed to the end wall 10, one being provided for each end wall. These bearing sleeves are externally threaded at their outer ends as indicated at 38 and are smooth bored internally to slidably receive the bushing 39 which is formed of a synthetic material of the plastic type, a material distributed under the trade name of "nylon" having been found the most perfect in that it is amply lubricated by any of the liquids present in cottage cheese, salads and similar foods, no other lubrication being necessary or desirable.

This bushing is slightly shorter than the bearing sleeve 37 to provide space for a resilient sealing element such as the rubber washer 40. This washer is preferably formed of a synthetic rubber which will not deteriorate and which will not impart any foreign flavor or odor to the food being processed, and of which there are several types that are suitable. The inner end of this bushing bears against the collar 20 on the shaft 19 and functions as a thrust bearing for the shaft.

The packing member consists of a two-member gland including a thrust collar 44 and a gland 43 having cooperative thrust shoulders 42, and the gland is internally threaded as indictaed at 45 for threading onto the bearing sleeve 37. The cooperatively related ends of the bushing and thrust collar are beveled as indicated at 41 for limiting compression of the resilient sealing element 40.

The assemblies for both ends of the mixer are identical with the exception that the coupling and handwheel are required for only one end.

For assembly, the agitator 11 is placed inside the bowl and the shaft ends 23 are inserted in the ends of the tubular agitator shaft 17. The pins 22 engage in the slots 18 for driving the agitator. The bushing is slipped over the shaft, followed by the sealing ring 41, then by the thrust ring 44 and collar 43 which is screwed onto the bearing sleeve 37. The clutch 28 with its handwheel is then slipped on the end of the shaft and is then ready for coupling to the prime mover shaft 26.

For disassembly and for cleaning, it is merely necessary to unscrew the cap 43 which frees the entire assembly for removal by withdrawing the shaft which withdraws the bearing bushing 39, sealing ring 41 and thrust collar 44.

Thus the entire mixer including bowl, bearing, shaft, and agitator can be quickly disassembled for thorough cleaning and sterilization. There is no possibility of oil or grease polluting the food mix since none is used, even the cross members 12 on the agitator being mounted in plastic bearings, such as the "nylon" previously mentioned, which, along with "Perlon L" and "Amilan" are polyamides, though the polyamide under the name of "nylon" alone is produced in the United States.

I claim:

1. A food mixer having a bowl having an end wall provided with a shaft passage, an agitator having a tubular shaft, a bearing sleeve on said end wall coaxial with said shaft passage, a drive and support shaft having an annular collar in spaced relation to one end and coupling means cooperative between said one end of said drive and support shaft and said tubular shaft, a polyamide resin bushing slidable in said sleeve and cooperative with said annular collar, said annular collar having a diameter in excess of that of the inside diameter of said bushing, stop means for limiting the degree of insertion of said bushing in said sleeve, and combined thrust and sealing means cooperative between said bushing and the outer end portion of said sleeve for urging and securing said bushing against said stop means, with said bushing and shaft subject to lubrication solely through liquids contained in the food product being processed within the bowl, and said drive and support shaft being removable with said bushing as a unit for cleaning through disconnection of said combined thrust and sealing means by withdrawal of the drive and support shaft.

2. A structure as defined in claim 1; a coupling slidably mounted and non-rotatable on the outer end of said shaft and having an integral handwheel for manual operation of said agitator for maintaining the contained food product in suspension and facilitating discharge of the contents of the bowl when inverted said handwheel coincidently comprising means for removing the coupling from the shaft to permit removal of the bushing from the shaft for cleaning, at will.

3. A shaft and bushing combination removable and replaceable at will for a food mixer comprising an agitator having an axial shaft, a bowl wall having a bore, a drive shaft having an annular collar located in spaced relation to one end and freely rotatable in said bore, and coupling means cooperative between said one end and said axial shaft, a bearing sleeve on said wall and having an inside diameter greater than said bore to form an internal collar, and a bushing slidable in said sleeve and cooperative with said internal collar functioning as stop means, and with said annular collar to function as a thrust bearing, and sealing and thrust means for said bushing and cooperating between said bushing and said sleeve for urging said bushing against said internal collar and being removable and replaceable at will for removal of said shaft and bushing as a unit for cleaning, with said annular collar withdrawing said bushing when said shaft is retracted.

4. A structure as defined in claim 3; means for connecting said shaft to a prime mover and for manually operating said agitator at will comprising a clutch member slidably and non-rotatably mounted on said drive shaft and removable from said shaft at will and including releasable securing means for maintaining said clutch member against accidental axial displacement, and a handwheel integral with said clutch member for manual operation at will for rotation of said shaft for operation of said agitator for maintaining a food mix in suspension during discharge.

5. A removable and replaceable bushing and shaft unit for a food mixer having an end wall and an agitator comprising, a shaft having an annular collar formed in spaced relation to one end and having coupling means for releasable coupling to the agitator, a bearing sleeve on said end wall, and a bore of lesser diameter formed through said end wall within the confines of said bearing sleeve to form an internal shoulder, a polyamide resin bushing slidable in said sleeve with the other end of said shaft rotatable therein and with said annular collar freely rotatable in said bore, and sealing and thrust means cooperative between said bushing and said sleeve at the outer end for maintenance against ingress of foreign matter from the exterior, and for urging said bushing against said internal shoulder, with said shaft and bushing subject to lubrication solely through liquids in food mixtures entering from the said one end to prevent contamination of the food product processed in the food mixer said shaft and bushing being removable at will as a unit for cleaning upon release of said sealing and thrust means.

6. A bushing and shaft unit removable and replaceable at will comprising, a shaft having an annular collar formed in spaced relation to one end and including releasable coupling means on said one end, a bushing rotatable on said shaft and having one end cooperative with said annular collar, a bearing sleeve having a bore slidably receiving said bushing and terminating in an internal thrust shoulder, a sealing ring cooperative with the other end of said bushing and with said shaft, a thrust collar cooperative with said sealing ring, and a gland threadedly cooperative with said sleeve and with said thrust collar for compressing said sealing ring against said bushing and said bushing against said thrust shoulder, and with said one end of said bushing thrust cooperative with said annular collar, whereby, release of said gland frees said shaft and bushing unit for removal at will.

7. A structure as defined in claim 6; a coupling member slidable and non-rotatable and removably and replaceably mounted on the other end of said shaft beyond said gland for coupling to driving means, and having a handwheel formed integrally therewith for manual rotation of said shaft at will, and spring urged retaining means for said coupling means for cooperation with said shaft for maintaining said coupling member against axial displacement when uncoupled from the drive means, said handwheel providing for convenient removal of the coupling member for freeing of the bushing for removal from the shaft for cleaning upon release of said gland.

8. A removable shaft and bushing unit comprising a bearing sleeve having stop means at its inner end, a bushing slidable in said sleeve and cooperative with said stop means, a shaft rotatable in said bushing and having an annular collar formed in spaced relation to one end and cooperative with one end of said bushing to provide a thrust bearing, and clearing said stop means, and a gland including sealing means for the other end of said bushing and including releasable securing means for securing the gland to the outer end of said sleeve and for urging said bushing into contact with said stop means to maintain the bushing against rotation, said shaft and bushing being removable as a unit by withdrawing the shaft following release of the gland from the sleeve.

References Cited in the file of this patent

UNITED STATES PATENTS

| | | |
|---|---|---|
| 1,049,984 | Bower | Jan. 7, 1918 |
| 1,396,574 | Heath | Nov. 8, 1921 |
| 1,909,324 | Wendler | May 16, 1933 |
| 1,930,941 | Modlin | Oct. 17, 1933 |
| 2,167,316 | Spangler et al. | July 25, 1939 |
| 2,219,519 | Fabrin | Oct. 29, 1940 |
| 2,576,575 | Collins | Nov. 27, 1951 |